Sept. 13, 1927.  L. CINQ-MARS  1,642,540
GAS HEATER
Filed Aug. 11, 1924
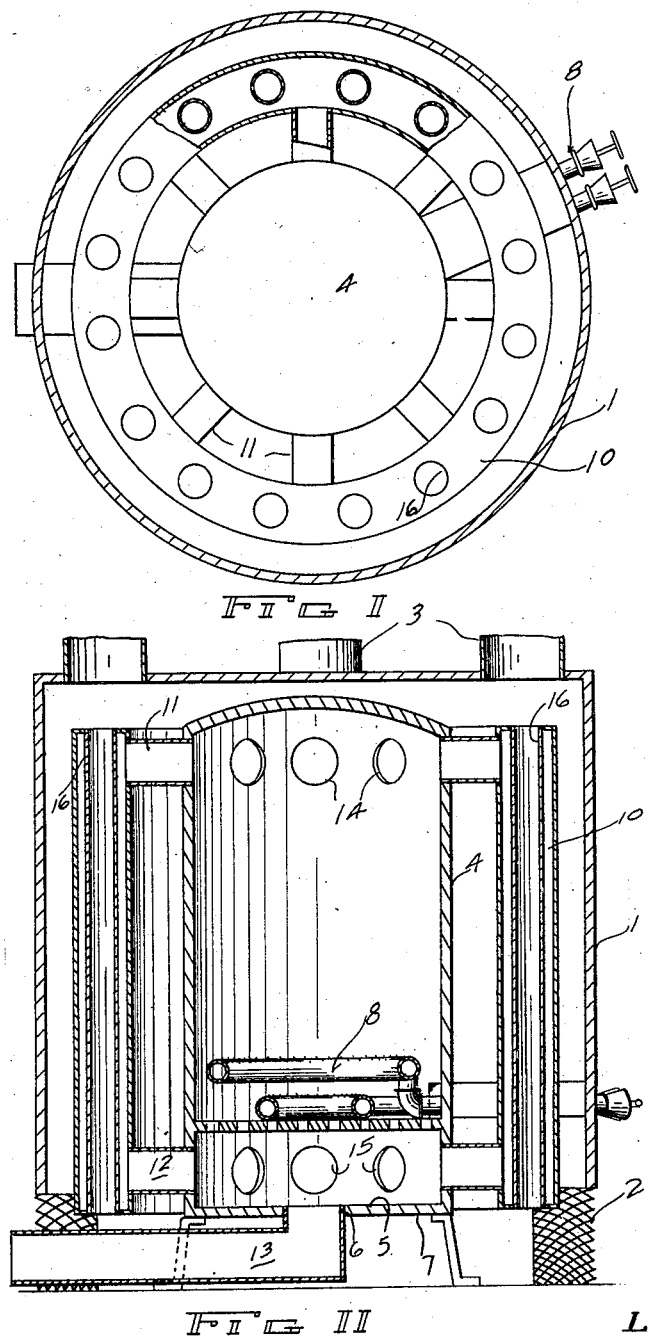
FIG. I
FIG. II
INVENTOR
L. CINQ-MARS
BY
ATTYS Patented Sept. 13, 1927.

1,642,540

UNITED STATES PATENT OFFICE.

LEGENDRE CINQ-MARS, OF SAN FRANCISCO, CALIFORNIA.

GAS HEATER.

Application filed August 11, 1924. Serial No. 731,326.

This invention relates to improvements in hot air furnaces of the gas heated type such as exemplified in my application for U. S. Letters Patent entitled "Gas furnace," Serial No. 696,524, filed March 3, 1924, the main objects being to increase the area of the parts of the furnace which heat the air without materially increasing the cost of manufacturing, to maintain the products of combustion separate from the heated air, and to equalize the draft in all circulatory parts of the heater by causing the gases, heat and products of combustion to travel equal distances from the burner to the point of connection of the heater with the chimney or flue.

The apparatus of the furnace disclosed in my prior application above referred to included a heating chamber containing a burner, a separate collection chamber below the first named chamber, and a plurality of pipes leading from the upper part of the heating chamber to the collection chamber, each pipe being of the same length and the collection chamber having a central flue or outlet opening. Thus the lineal distance from the burner through each pipe to the outlet or flue opening is the same and the draft is equalized and causes a better and more efficient heating operation mainly for two reasons, viz: First, because the burner will burn the fuel evenly and thoroughly under balanced or equalized draft conditions, and second, because the heater parts are uniformly heated and thus provide for a quicker and more thorough heating of the air around said heated parts.

The present invention provides for increasing the efficiency of hot air heaters of the type above described through use of air flues extending through the passage or passages connecting the heating or burner chamber with the collection chamber, thus setting up of a circulation of air in the air heating chamber surrounding the heater and exposing additional heating area to the air in the air heating chamber. This increase in the area of heated parts is further provided by use of an annular passage surrounding the burner chamber and connected by short pipes at its upper and lower ends to the separate burner and collection chambers, and by providing air flues through this annular passage a further increase in exposed area of heated parts is provided. This annular passage is used in place of the plurality of separate pipes or passages hereinbefore mentioned and it also provides for the balanced or equalized draft inasmuch as due to the fact that the outlet opening in the collection chamber is in the center of the chamber and the entire flue or passage space offers no "short cuts" for draft, that is, the products of combustion, etc.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

Referring to the drawing:

Fig. 1 represents a top plan view of the furnace with the top of the furnace removed, part of the heater being broken and shown in section.

Fig. 2 represents a vertical sectional view of the furnace.

In carrying out the invention as shown in the accompanying drawing there is provided an air heating chamber 1, having screened atmospheric air intake openings 2, at its lower end and a plurality of hot air pipes 3 leading from its upper end. Air is heated in this chamber by the specially constructed "closed" heater of this invention which is centrally located in said chamber and comprises a preferably cylindrical burner or heater chamber 4, a preferably cylindrical collection chamber 5 at the lower end and preferably contiguous with the burner, which chamber 5 has a central outlet opening 6 in its lower wall 7, a gas burner 8 in the lower part of the burner chamber, an annular passage or chamber 10 spaced from and surrounding the burner chamber, pipes 11 joining the upper ends of the chambers 4 and 10; pipes 12 joining the lower end of the chamber 10 with the side of the collection chamber, and the flue 13 connected with the opening 6. The upper portion of the burner chamber has a plurality of equidistantly spaced openings 14 therein from which the pipes 11 extend and the collection chamber is provided with similar openings 15 from which the pipes 12 extend. The draft set up is equalized throughout the heater and products of combustion, etc., passing through any of the pipes 11 and 12 into the collection chamber, travel the same distance to reach the central outlet opening 6 in the collection chamber. This insures uniform heating of the heater and a smooth even burner operation.

Extending vertically through the annular chamber are air passages 16 open at their upper and lower ends and at corresponding ends of the annular chamber, said passages being in the form of cylindrical pipes circumferentially spaced from the cylindrical walls of the annular chamber. These passages are equidistantly spaced and do not interfere with the passage of products of combustion, etc., through the annular chamber. The entire outer surface of the annular chamber becomes heated and provides for an effective heating of the air in the main or air heating chamber. The air passages through the annular chamber provide for exposure of a greater heated area to the air and also cause a circulation of air in the main chamber with the result that the air is heated more quickly. The annular chamber spaced circumferentially from the burner chamber, and the air passage through the chamber together with the burner chamber, collection chamber, pipes 11 and 12 and flue, become heated and cause the air in the main chamber to quickly heat without permitting the products of combustion to enter said main chamber. The entire heater assembly is simple as to construction, inexpensive and compact and provide a greater heating area than other heaters of which I am aware. This large heating area in a heater wherein the parts are uniformly and evenly heated provides for a quicker, thorough and generally effective heating of air at a lower fuel consumption.

The separate amounts or quantities of the products of combustion, etc., which pass through the outlet openings of the burner chamber travel the same distance from said openings, or better, from the burner area to the flue outlet opening of the collection chamber. This eliminates accumulation of unburned or waste gas, prevents hot and cold spots in the heater and otherwise provides for the advantages hereinbefore more particularly pointed out.

I claim:

A heater comprising a burner casing closed at its upper and lower ends, a false bottom mounted within the casing above the lower end thereof and defining a collection chamber between it and said lower end, said casing having a plurality of equi-distantly spaced openings disposed between the lower end and false bottom, a plurality of similarly arranged openings adjacent the upper end of the casing, a burner mounted within the casing above the false bottom, said casing having a centrally disposed outlet at its lower end, an outlet flue in communication with the outlet opening, an annular flue surrounding said burner casing in circumferentially spaced relation thereto, which chamber is provided with a plurality of equi-distantly spaced openings on its inner side adjacent its upper end and with a similar series of openings adjacent its lower end, lateral flues connected with the equi-distantly spaced openings in the casing and with the opening of said annular chamber, said annular chamber having a plurality of openings in the upper and lower ends, and a plurality of air flues disposed in said annular chamber in spaced relation to the side walls thereof with their ends connected with the last named openings, and another casing surrounding the burner casing and annular chamber, which casing is provided with hot air discharge openings at its upper end and atmospheric air intake openings at its lower end.

LEGENDRE CINQ-MARS.